United States Patent
Texeraud et al.

(10) Patent No.: US 10,486,814 B2
(45) Date of Patent: Nov. 26, 2019

(54) VEHICLE PASSENGER SEAT WITH REST CONFIGURATION

(71) Applicant: STELIA AEROSPACE, Rochefort (FR)

(72) Inventors: Laurent Texeraud, Clavette (FR); Benoît Trillaud, Echillais (FR); Christophe Canal, Breuil-Magne (FR)

(73) Assignee: STELIA AEROSPACE (FR)

( * ) Notice: Subject to any disclaimer, the term of this patent is extended or adjusted under 35 U.S.C. 154(b) by 0 days.

(21) Appl. No.: 15/943,922

(22) Filed: Apr. 3, 2018

(65) Prior Publication Data
US 2018/0362165 A1  Dec. 20, 2018

(30) Foreign Application Priority Data
Apr. 4, 2017  (FR) ...................................... 17 52932

(51) Int. Cl.
B64D 11/06 (2006.01)
B60N 2/34 (2006.01)

(52) U.S. Cl.
CPC ............ *B64D 11/0604* (2014.12); *B60N 2/34* (2013.01); *B64D 11/064* (2014.12); *B64D 11/0641* (2014.12)

(58) Field of Classification Search
CPC .............. B64D 11/0604; B64D 11/064; B64D 11/0641; B60N 2/34; A47C 17/12; A47C 17/16
USPC ............................................ 297/342, 354.13
See application file for complete search history.

(56) References Cited

U.S. PATENT DOCUMENTS

| | | | | |
|---|---|---|---|---|
| 3,171,682 | A * | 3/1965 | Buser | B60N 2/3013 296/66 |
| 3,202,453 | A * | 8/1965 | Richards | B60N 2/3011 296/66 |
| 8,419,123 | B2 * | 4/2013 | Hankinson | B64D 11/06 297/118 |
| 9,629,471 | B2 | 4/2017 | Van Hool et al. | |
| 2005/0077761 | A1 * | 4/2005 | Dryburgh | A47C 1/0352 297/68 |
| 2012/0038196 | A1 * | 2/2012 | Lawson | B64D 11/06 297/354.13 |
| 2016/0325838 | A1 | 11/2016 | Erhel | |

FOREIGN PATENT DOCUMENTS

EP  2762354  8/2014
WO  2015097630  7/2015

OTHER PUBLICATIONS

French Search Report, French Application No. 1752932, dated Dec. 20, 2017.

* cited by examiner

*Primary Examiner* — Milton Nelson, Jr.
(74) *Attorney, Agent, or Firm* — Perman & Green, LLP

(57) ABSTRACT

A seat, including a seat bottom for which a seat frame is supported by a base, and a seat back, the seat including a "seated" position, a "lying" position and an intermediate "resting" position. A seat plate can be moved in rotation around a rear axis located at the side of a rear edge of the seat, the seat plate being movable in rotation around a tilting axis in front of the rear axis, the seat frame is moved forward during conversion from the "seated" position to the "lying" position.
An essentially horizontal rear segment. An intermediate rear segment with a downward slope greater than the slope followed by the tilting axis. An intermediate front segment with an essentially horizontal upward slope.

14 Claims, 4 Drawing Sheets

VEHICLE PASSENGER SEAT WITH REST CONFIGURATION

CROSS REFERENCE TO RELATED APPLICATIONS

This application claims priority to and the benefit of French Application No. 1752932, filed on 4 Apr. 2014, the disclosure of which is incorporated herein by reference in its entirety.

BACKGROUND

1. Field

This disclosed embodiment pertains to the field of passenger seats such as the seats used in passenger spaces in vehicles and, more specifically, in aircraft.

The disclosed embodiment concerns a seat convertible into a bed and including, between the "seating" position and the "lying" position, an intermediate position for "resting", in which the passenger is placed in a relaxing position.

More specifically, in the disclosed embodiment, the layout of the structure of the seat allows continuous modification of the position of the seat cushion and the position of the backrest between the seating and lying positions, ensuring passenger comfort when the seat is in the intermediate, resting position.

2. Brief Description of Related Developments

In the field of passenger transport, in particular in aircraft, the seats offered to passengers are equipment with high commercial impact.

Airlines which operate aircraft are therefore demanding in terms of the comfort offered to passengers, but also remain concerned with the cost of the equipment, both with regard to its purchase and its maintenance.

In the luxury classes, first class and business class, aircraft cabin seats are, in general, capable of being converted in order to transform the seat from the seated position, required during takeoff and landing, to a lying position that is nearly horizontal.

In order to convert from a seated position to a lying position, the seat bottom is generally moved forward by sliding or rolling on rails, generally by means of a first engine, and the seat back is inclined backward, until it is close to aligned with the seat bottom, by means of a second engine.

In this conversion, forward movement of the seat is necessary so that the inclined seat back does not intrude into the volume of space located behind the seat, which is in general allocated to another passenger, and is often blocked by a fixed covering shell.

A disadvantage of this solution is the lack of comfort when the seat is in an intermediate, resting position, where the seat back is only partially inclined toward the back.

This solution, which, in practice, only affects the angle formed at the lumbar vertebrae of the spine, leads to the passenger sliding forward, a phenomenon also known as "submarining" when the passenger tends to slide under the seat located in front of his.

In order to avoid this sliding phenomenon, one solution consists of raising the front of the seat bottom when the seat back is inclined backward so that the surface of the seat bottom is inclined backward and prevents the natural tendency of the passenger to side forward. In this case, the front edge of the seat bottom moves away from the floor and the passenger's feet, in many cases, are no longer in contact with the floor to which the seat is attached. This configuration, the purpose of which is to improve comfort, quickly becomes uncomfortable due to the compression felt by the passenger in the popliteal hollows.

In addition, this supplementary movement of the seat bottom requires the installation of an additional actuator, which hinders attainment of the generally desired goals of decreasing the weight and cost of a seat.

SUMMARY

This disclosed embodiment provides a solution for a simplified conversion of a seat between different positions: seated, resting, lying, which avoids the installation of additional actuators to those necessary for moving the seat and inclining the seat back, and ensures the passenger's comfort when in the resting position.

According to the disclosed embodiment, a vehicle passenger seat, comprising a seat bottom and a seat back, a seat frame consolidated with a base by which the seat can be attached to the vehicle.

The seat comprises at least one "seated." position, one "lying" position and at least one "resting" position, which is intermediate between the "seated" position and the "lying" position.

In addition, in the seat:
 a seat plate in the seat frame can be moved in rotation
  around an axis behind said seat, oriented in a transverse
  Y direction, horizontal to the seat and perpendicular to
  a vertical XZ plane of the overall symmetry of the seat,
  with said rear axis being positioned in an X longitudinal direction on the side of a rear edge of the seat;
 the seat plate can be moved in rotation around a tilting
  axis, parallel to the rear axis, positioned according to
  the X longitudinal direction, in front of said rear axis
  and between the rear edge of the seat and a front edge
  of the seat;
 the seat frame is moved forward during a seat conversion
  from the "seated" position to the "lying" position, a
  conversion during which:
  the tilting axis is moved on the seat plate following a
   descending trajectory in relation to the horizontal X
   longitudinal direction;
  the rear axis is moved on the seat plate following a
   second continuous trajectory comprising successively, according to the direction of: movement
   toward the front of the seat:
  an essentially horizontal rear segment;
  an intermediate rear segment with a downslope greater
   than the slope followed by the tilting axis;
  an intermediate front segment with an upslope;
  an essentially horizontal front segment.

Thus, during movement of the seat during a conversion of the seat by an occupant of the seat, the movement of the seat is guided by modifying the height and tilt of the seat in order to adapt this height and this tilt to each of the desired positions in order to achieve a comfortable position for the seat occupant.

Beneficially, the tilting axis is attached to at least one carriage, mounted on a rail of the base which guides the carriage according to the first trajectory when the seat frame is moved in a longitudinal direction.

Beneficially, the second trajectory followed by the rear axis is determined by at least one guide ramp on the seat base, in which guide ramp at least one seat roller or roller circulates when the seat frame is moved longitudinally, with one roller axis or roller bearing positioning the rear axis.

Such rails and guide ramps define for the first trajectory and the second trajectory the shape required to give the seat frame the tilt angle and vertical position sought for each longitudinal position of the seat.

In one aspect of the disclosed embodiment, the rear intermediate segment and the front intermediate segment determine, at their junction, a low point, at a height of HMIN, according to a vertical direction Z in relation to a horizontal reference plane, of the second trajectory, at which low point the rear axis is situated when the seat is in the "resting" position, with the height HMIN being such that, given the dimensional characteristics of the seat frame and of the seat base, when the seat is in the "resting" position:
- the seat plate is tilted backward in relation to the position of said seat plate in the "seated" position of the seat;
- a resulting height in relation to the reference plain of a front edge of the seat is essentially at the height of said front edge when the seat is in the "seated" position;

Thus, the seat occupant finds his legs in a configuration that is close to, if not identical to, the "seated" position and the "resting" position, which enables him to keep his feet on the floor in both positions, or in a foot position that is, ideally; regulated by him, without having to change the setting.

In one aspect of the disclosed embodiment, when the rear axis is located at the junction of the rear segment and of the intermediate rear segment, the seat is horizontal, or tilted forward.

In this seat position, located between the "seated" position and the "resting" position, the seat occupant is overall less tilted backwards and less "compressed" in the seat so that it is easier for him to stand up, in particular for persons who may have difficulties, for example, due to their age or to a physical handicap.

In ergonomic aspects:
- the essentially horizontal rear segment is, viewed from back to front, tilted more downwards at an angle corresponding to an angle of the first downward trajectory, and tilted upwards at an angle of 10 degrees in relation to a horizontal reference plane that is typically at a zero-degree angle;
- when the seat is in the "seated" position, the seat is tilted backward at an angle, in relation to a horizontal reference plane, between 5 and 15 degrees, typically about 10 degrees;
- when the seat is in the "resting" position, the seat is tilted backward at an angle, in relation to a horizontal reference plane, between 18 and 30 degrees, typically about 22 degrees;
- when the seat is in the "lying" position, the seat is tilted backward at an angle, in relation to a horizontal reference plane, that is less than or equal to 5 degrees absolute value;
- each rail of the seat base is tilted forward at an angle between 2 and 8 degrees in relation to a horizontal reference plane, typically about 5 degrees.

In one aspect of the disclosed embodiment, the seat comprises two rails on the base, two carriages supporting the seat plate, two guide ramps fixed to the base, said two rails, said two carriages and said two guide ramps being laid out essentially symmetrically in relation to a vertical XZ plane of symmetry for the seat assembly.

Thus, a structure of great stability is formed, in particular, lateral stability, in which forces are distributed laterally on movable parts, which orient the transfer of forces of the seat bottom and of the seat back toward the base.

In one aspect of the disclosed embodiment, the structure of the seat back is jointed on the seat frame around a hinge line parallel to the transverse Y direction, located close to the rear edge of the seat frame, so as to determine an angle between the seat bottom and the seat back that can be adjusted, when using the seat, between a minimum value essentially equal to 90 degrees, adapted to the "seated" position, and a maximum value essentially equal to 180 degrees, adapted to the "lying" position.

Beneficially, at least one base abutment works with a first stop surface of the back frame to limit the forward angular movement of the seat back and works with a second stop surface of the back frame to limit the backward angular movement of the seat back.

In one aspect of the disclosed embodiment, the movement of the seat bottom between the "seated" position and the "lying" position is executed by a single actuator, with the various angular positions of the seat bottom resulting from the longitudinal position of the seat frame in relation to the seat base.

BRIEF DESCRIPTION OF THE FIGURES

The disclosed embodiment is described in reference to the figures, given as examples and not as limits, of an aspect of the disclosed, which, in a schematic way, represent:

FIG. 1C: an exploded partial view of the seat frame of FIG. 1a;

For the different figures, the drawings are not necessarily shown at the same scale.

DETAILED DESCRIPTION

Figure 1A:
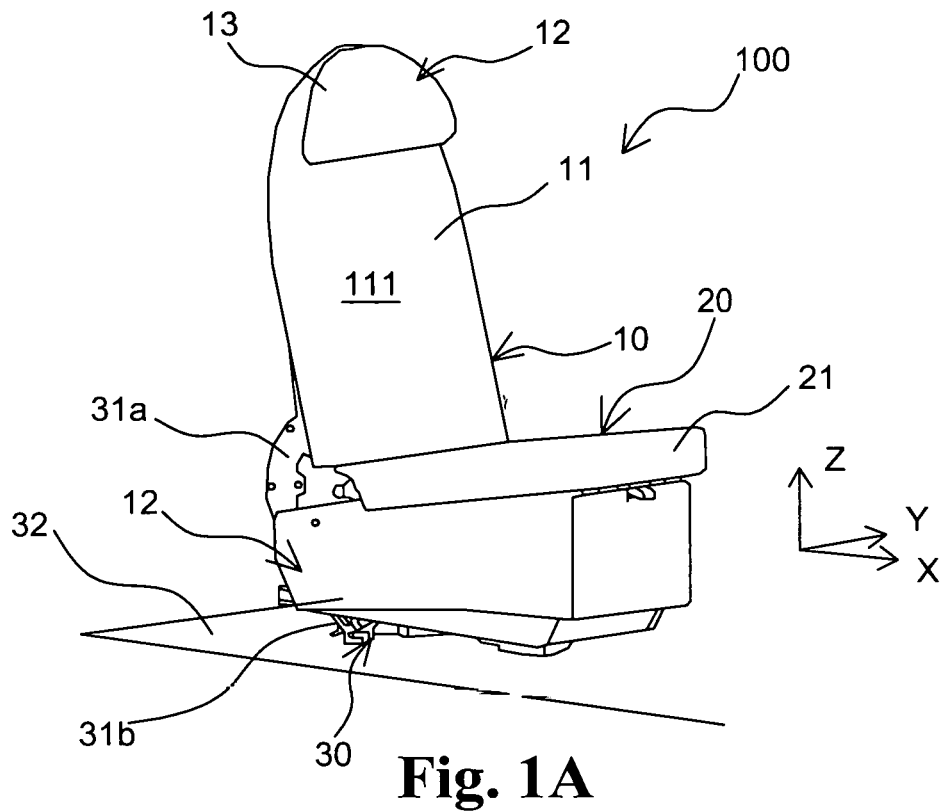
FIG. 1A: an isometric view of a simplified seat, comprising a seat bottom and a seat back, fixed on a floor.

FIG. 1a illustrates an example of a seat (100) according to the disclosed embodiment in the seated position.

For the purposes of the description, a system of conventional axes is referred to, connected to the seat, with an X longitudinal axis oriented positively toward the front of the seat, a vertical Z axis, oriented positively upward and a lateral Y axis, perpendicular to a plane defined by the horizontal and vertical directions, oriented positively toward the left of the seat.

The terms front, back, up and down, and similar terms or expressions related to direction or orientation, refer to the positions, orientations or directions which will be given to them by a user of the seat in seated position in said seat. Thus, the front of the seat corresponds to the direction toward which the occupant seated in the seat is looking, without turning his head, regardless of the orientation which the seat may have in relation to the direction of movement of the vehicle in which it is installed.

In a known manner, the seat in FIG. 1 comprises a seat bottom (20) and a seat back (10). The seat here is simplified and stripped of accessories not necessary to the description of the invention or its understanding, for example, armrests, which may or may not be included in a seat according to the disclosed embodiment.

The seat also comprises a frame (30), partially visible in FIG. 1a, which, in the seat, is covered by pads, seat bottom pads (21) and seat back pads (11) and covering panels (12) for reasons of comfort, esthetics and safety.

Figure 1B:
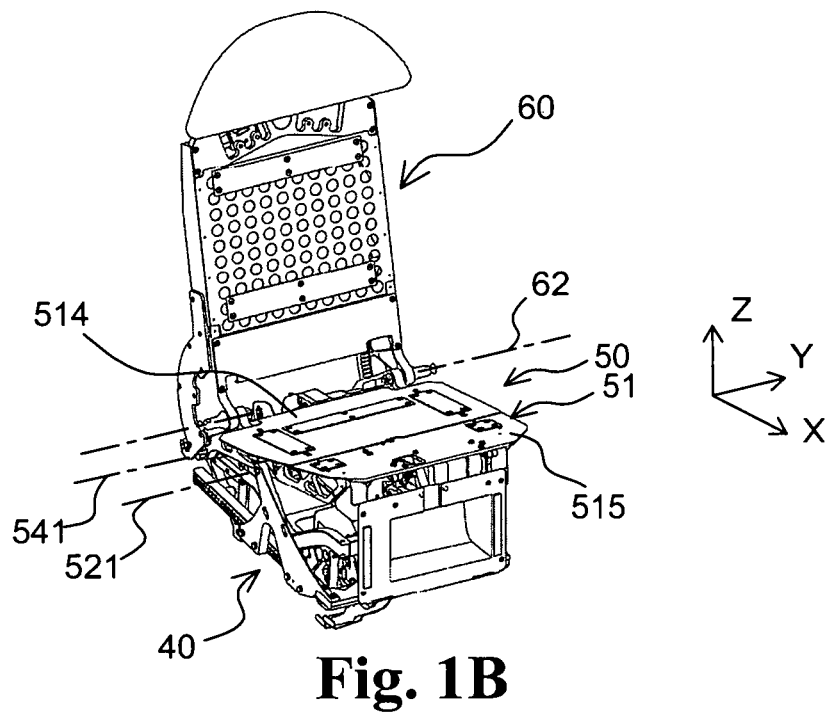
FIG. 1B: an isometric view of the seat frame in FIG. 1a, stripped of pads and covering panels, to reveal the principal mechanical components of the seat.

FIG. 1b illustrates the seat represented in FIG. 1a, stripped of pads and covering panels so as to show the frame (30).

The frame is partial in that some of the components not used in the description of the disclosed embodiment are not shown, for example, said frame is represented without head-supporting devices, leg rests, back supports, armrests, or movement locking systems.

The Person versed in the Art will have available, on the seat described, those necessary or optional components for a specific aspect of the disclosed embodiment, without difficulty.

The frame, which provides the seat with a strength and rigidity to support the weight of an occupant, under all conditions of use specified for said seat, facilitates the transfer of forces to another structure which must support the seat, for example, a floor (32) of the vehicle to which the seat is attached.

The seat frame presented in FIG. 1b shows three principle sub-assemblies:
  a base or base structure (40)
  a seat or seat structure (50)
  a back or back structure (60).

In order to simplify the description, the base structure will be designated "base", the seat structure will be designated "seat" and the back structure will be designated "back", so that the person versed in the art will be able to determine if it must be understood that, in a given context, the term relates to the structure of a sub-assembly or to the complete assembly. For example, and depending on the context, the term "seat" will designate the complete seat, with the seat frame, pads and other possible seat accessories, as represented schematically in FIG. 1a, or the seat structure, for example, as represented schematically in FIG. 1b.

Figure 2A:
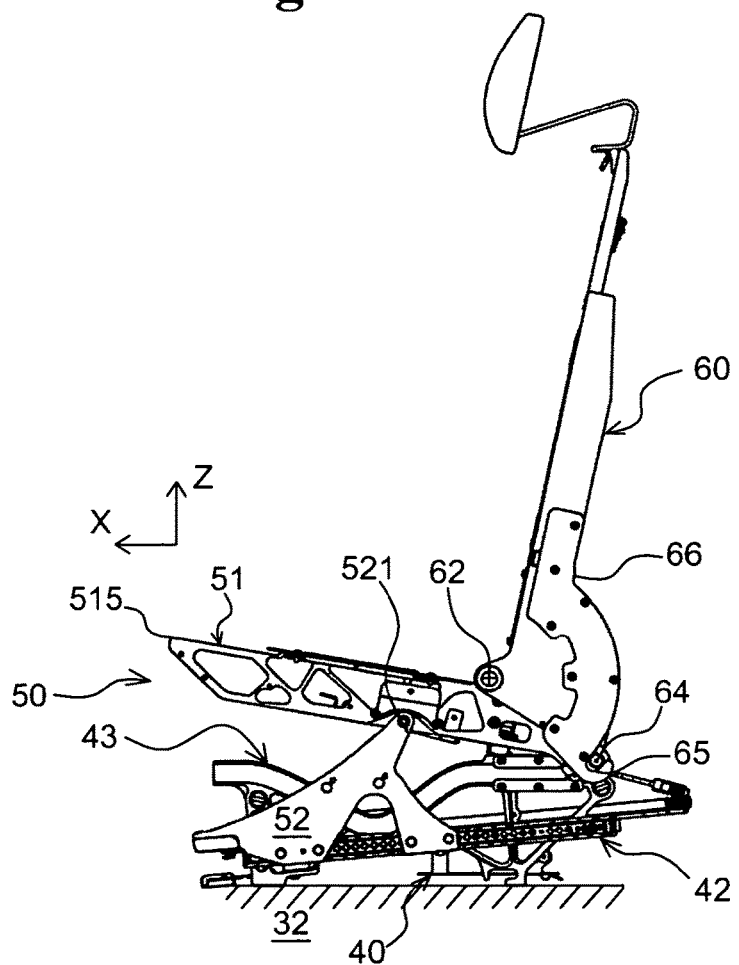
FIGS. 2A, 2B, 2C: a profile view of the seat frame of FIG. 1b, illustrating the relative positions of the principal seat components in relation to a base when the seat is in the "seated" position, FIG. 2a, in the "resting" position, FIG. 2b, and in the "lying" position, FIG. 2c.

FIG. 2a shows, in simplified form, the structure of FIG. 1b in profile view.

In FIG. 2a we find the principal elements that determine the capacity for movements, both translational and rotational, in a vertical plane XZ component, which are detailed below.

Figure 3:
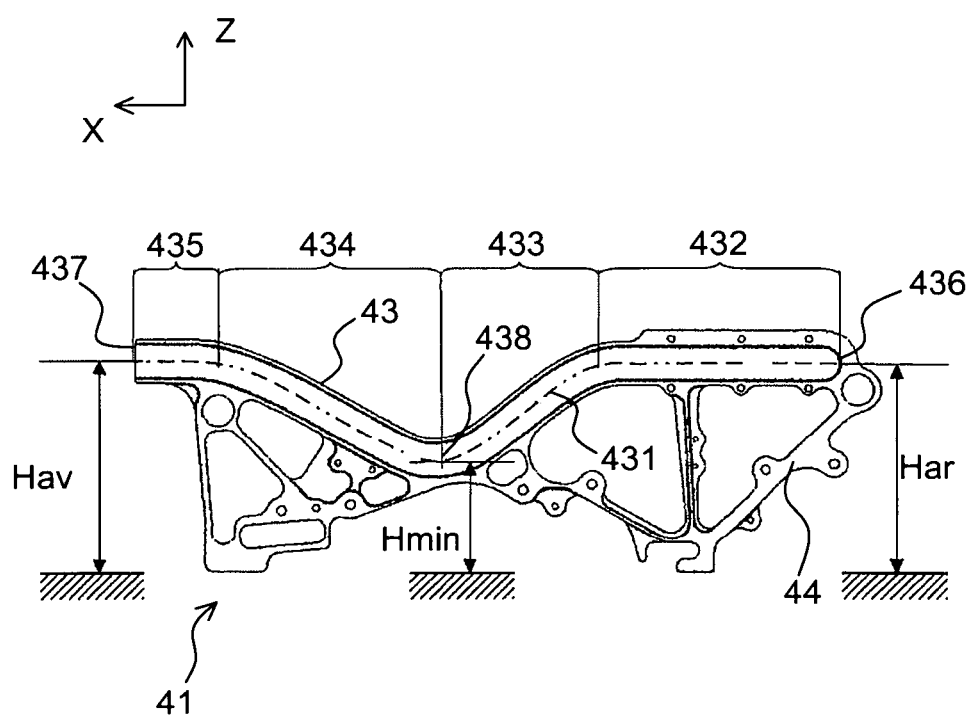
FIG. 3: in profile view, and example of the guiding rail of a seat roller.

The base (40) comprises two flanges (41) arranged laterally and symmetrically on the lateral edges of the base, of which only one is visible in the profile view of FIG. 2a and for which an example of execution, isolated from the rest of the structure, is shown in FIG. 3.

Each flange (41) is formed of a deck (44) adapted to bear the components of the base and to transfer forces from the seat to the floor (32) or to another structure to which the seat is attached.

Each flange also bears a guide ramp (43) according to a double S profile, with a bottom point in the median portion of said guide ramp, intended to guide the movement of a rear roller (54) the operational details of which will be described below.

A guide ramp (43) comprises, from a rear extremity (436) to a front extremity (437):
  a rear segment (432);
  an intermediate rear segment (433);
  an intermediate front segment (434); and
  a front segment (435).

The four segments thus defined are connected by curved connecting segments in order to provide continuity from the guide ramp and to define a trajectory (431) followed by the rear roller (54) between the rear (436) and front (437) extremities.

In the illustrated example, each of the rear, intermediate rear, intermediate front and front segments is substantially in a straight line.

The rear segment (432) and the front segment (435) are substantially horizontal.

The intermediate rear segment (433) has a downward slope toward the front and the intermediate front segment (434) has an upward slope toward the front, in order to determine, at their junction, a bottom point (438) of the trajectory (431), determined by the guide ramp (43) for the rear roller (54).

The rear extremity 436 is located at a height HAR in relation to a horizontal reference plane, for example, the plane of the floor (32) when the seat is attached to a floor, the front extremity (437) is at a height HAV in relation to a horizontal reference plane, and the bottom point (438) is at a height HMIN less than the rear height (436) and the front height (437).

The guide ramps (43) supported by each of the lateral flanges (41) are symmetrical in relation to each other and to a vertical axial plane XZ of vertical symmetry to the seat assembly, and each determine a trajectory 431 of the rear roller (54) of the seat evolving in a vertical plane.

In the disclosed embodiment illustrated in FIG. 3, each guide ramp is executed integrally with the flange that supports it.

Each flange (41) also bears a rail (42) in the form illustrated, with a system of telescoping rails comprising a fixed rail (421) on which a sliding rail (422) slides.

Both telescoping rails are rectilinear rails here.

The fixed rail (41), fixed to the flange (41), is held in a longitudinal vertical plane XZ and with a slope tilted toward the front of the seat in relation to horizontal direction X.

The sliding rail (422) slides in relation to the fixed rail (421) between a retracted position and an extended position in which said rail is advanced in relation to the retracted position.

Figure 1C:
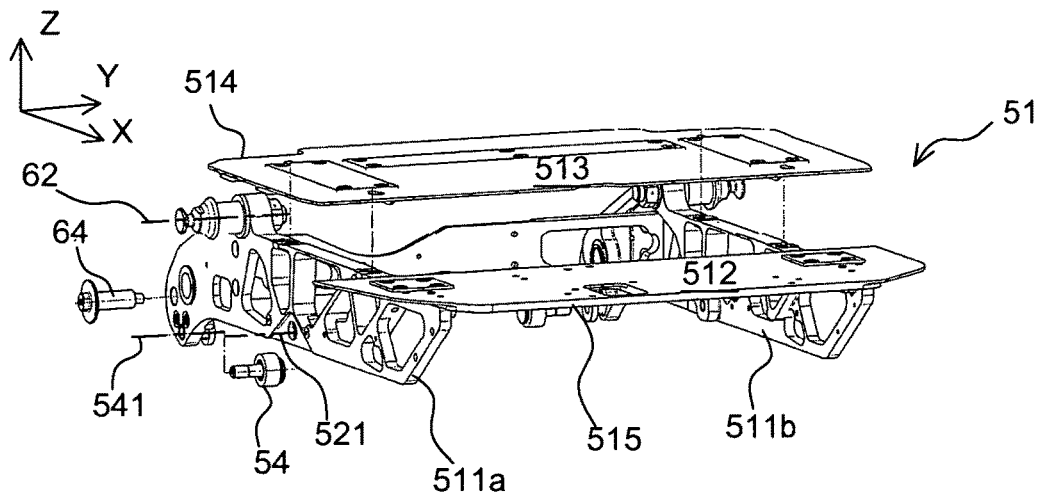

The seat (50) comprises a seat plate (51), illustrated here in exploded partial view in FIG. 1c, comprising a support structure for the seat pads (21) and comprising longitudinal beams (511a, 511b), supporting upper panels (512, 513).

The seat plate (51) is united with the base (40) by rear seat rollers (54) and by front seat carriages (52)

In FIG. 2a, the seat rollers are not visible and only one front carriage is visible. The arrangement of the rollers of one part and of the carriages of another part is symmetrical in relation to the vertical axial plane of symmetry XZ of the seat assembly.

Each front carriage (52) of the seat is jointed on the seat plate around a tilting axis (521) parallel to lateral axis Y such that the seat plate (51) is able to assume an angle more or less tilted toward the rear or toward the front around said tilting axis.

In this case, the tilting axis (521) is located between a rear edge (514) and a front edge (515) of the seat such when tilting toward the rear of the seat plate (51) around the tilting axis (521), the front edge (515) is moved upward and the rear edge (514) is moved downward, and, inversely, the front edge downward and the rear edge upward when the seat plate tilts forward.

Each seat carriage (52) is also fixed immovably to the corresponding sliding rail (422) such that the sliding of said sliding rail in relation to the fixed rail (421) enables moving, according to a direction determined by the orientation of said fixed rail, said seat carriage and therefore the tilting axis (521) and the seat plate (51).

Each rear roller (54) is fixed to the seat plate (51) in a rear portion of said seat plate, near a front edge (514) f said seat plate, with a rear axis (541) parallel to the lateral axis Y.

Each rear roller (54) is also engaged with the corresponding guide ramp (43) so as to follow the trajectory (431) determined by said guide ramp when the seat (50), and therefore also said rear roller, is moved following longitudinal direction X in relation to the base (40).

The seat back (60) is jointed on the seat bottom (50) around a hinge line fixed in relation to the seat plate (51) and fixed in relation to the seat back (60).

The rotation of the seat back (60) is limited toward the front by abutments (64) of the seat plate which work with the first stop surfaces (65), FIG. 2a.

Figure 2B:
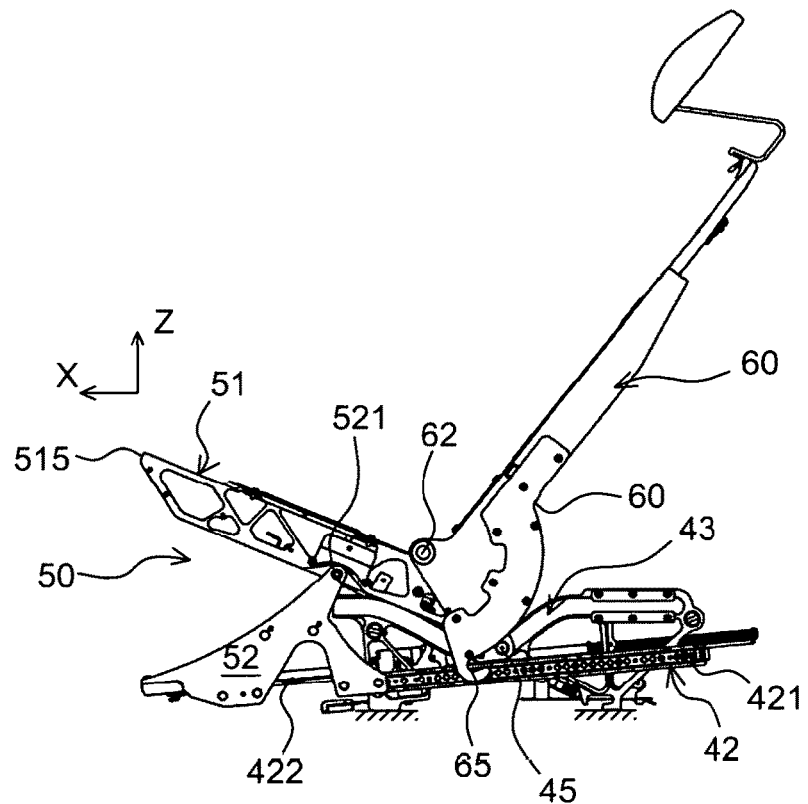
Figure 2C:
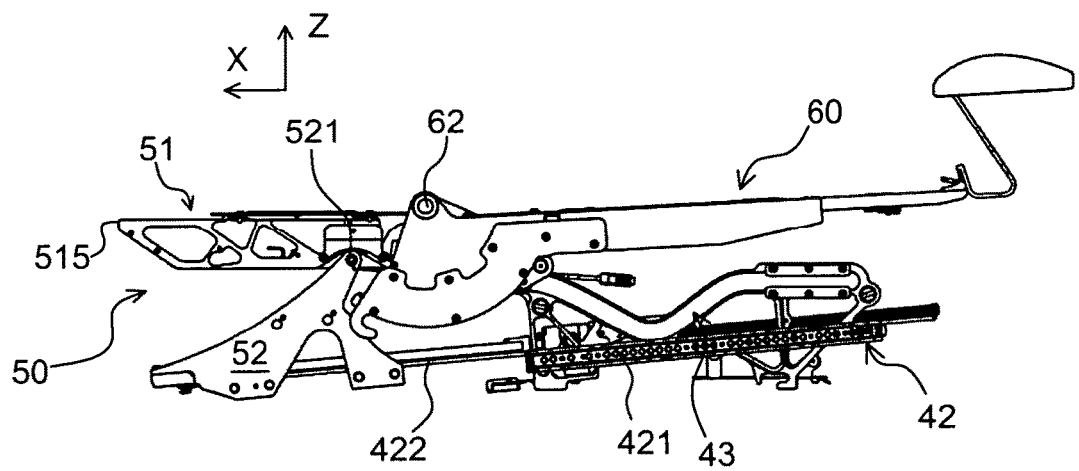

The rotation of the seat back (60) is limited toward the rear by abutments (64) of the seat plate which work with the second stop surfaces (66), FIG. 2c.

FIGS. 2a, 2b and 2c illustrate the structure of a seat in three different positions.

FIG. 2a corresponds to the "seated" position in which a seat occupant is seated in the conventional armchair position, the position used when airplanes are taking off and landing.

In this position, the seat bottom (50) is located at the rear of the base (40). The rear rollers (54) of the seat bottom are located at the rear extremities (436) of the guide ramps (43), or at least close to the rear extremities of the guide ramps, at a rear height HAR.

The seat back (60) is, in this case, illustrated in its highest position, with the abutment (64) against the first stop surface (5). A tilt toward the rear of the seat back (60) is possible in this case, without movement of the seat bottom (50), even if it may be limited, in practice, by the seat surroundings.

FIG. 2c shows the seat frame when the seat is adjusted to the "lying" position, namely, to form an essentially horizontal bed. In this case, the seat bottom and the seat back are aligned and both are essentially horizontal, with this arrangement possibly being slightly different in order to compensate for the thicknesses and shapes of seat pads (21) which are not identical or uniform.

In this case, the seat bottom (50) is moved forward in relation to the base (40) in a position in which the rear rollers (54) are located at the extremities in front of the guide ramps at a height HAV.

The forward movement of the seat bottom (50) is obtained with the forward extension of the sliding rail (422) which holds and guides the carriage in front of the seat (52) This movement toward the front is accompanied by a modification of the height of the tilting axis (521) to which the seat plate (51) is jointed, which is a function of the tilt of the fixed rail (421). In this case, the height of said tilting axis in relation to a horizontal reference plane decreased due to the forward tilting of the fixed rail (421).

The resulting height of the tilting axis (521) and the height HAV of the guide ramps are determined in this "lying" position so that the seat bottom is in the essentially horizontal position sought.

As illustrated in FIG. 2c, the seat back is titled toward the rear in relation to the seat bottom until contact with the abutments (64) with the second stop surfabes (66).

Both positions of the assembly obtained here in the "seated" and "lying" conditions are conventional for a seat that can be converted into a bed.

With regard now to the "resting" position illustrated in FIG. 2b, the seat bottom (50) is forward in relation to the base (40) in a position following the longitudinal direction Y intermediate between those of the "seated" position of FIG. 2a and the "lying" position of FIG. 2c.

In this position, the rear rollers (54) of the seat bottom in the guide ramps are located on the trajectory (431) at the bottom point (438) at a minimum height HMIN. In this intermediate position following the longitudinal direction, the tilting axis (521) is also found at a decreased height in relation to its height in the "seated" position, due to the slope of the fixed rails (421), but this decrease in height is essentially less than that of the rear rollers of the seat bottom due to the accentuated concave shape of the trajectories (431) determined by the segments of the guide ramps (43).

As a result, as illustrated by FIG. 2b, the seat plate (51) is found titled toward the rear, around the tilting axis (521), by a lowering of the rear (514) of the seat bottom, close to the rear rollers of the seat bottom. In addition, a front edge height (515) of the seat bottom is not increased by this tilting toward the rear, or is increased only by limited height, due to the lowering of the front carriages seat bottom (52) attached to the sliding rails (422), the trajectory of which descends toward the front.

The movement of the seat bottom (50) following longitudinal direction X is preferably executed by a unique actuator, not represented, for example, a conventional electric actuator.

In the example of the disclosed embodiment, the movement of the seat back jointed to the seat bottom around the hinge line (62) is executed by a seat back actuator, not represented, such that the seat back may be stilted at different values for each longitudinal position of the seat bottom, up to the limits of environmental structural interferences.

The description of the seat and of its benefits will be better understood with regard to the functioning of the seat illustrated in FIGS. 2a, 2b and 2c during the conversions between the "seated", "resting" and "lying" positions.

Considering FIG. 2a, illustrating the seated position, the seat bottom (50) is in a back-tilted position in relation to the base (40), in which the rear rollers (54) of the seat (54) are located at the rear extremities (436) of the guide ramps (43), or are at least close to said rear extremities. In this "seated" position, the seat carriages fixed to the sliding rails (422) are also in a back-tilted position.

In this seat position, the seat rollers are at rear height HAR of the guiding rails (43) and the tilting axis (521) is at a maximum height on the tilted ramps formed by the rails (42).

The geometric and dimensional characteristics are chosen during design of the seat in order to determine, in this rear rear position, a height of said seat in relation to the floor, a height generally considered as an SRP point of reference of the seat, and a longitudinal slant of the seat in relation to a horizontal plane adapted to the comfort of the "seated" position.

In practice, as in the illustrated example, the seat has a longitudinal slant toward the rear following an angle in relation to the horizontal between 5 and 15 degrees which allows a user of the seat to feel secure and stable in his seat.

A height of the front edge of the seat (20) comprising seat pads (21) is determined so that a passenger from a target population used as a reference may place his feet flat on the floor, or on a foot rest, when he is seated in the seat.

Also, in the "seated" configuration, the back is preferably positioned to form a 90 degree angle with the seat, an angle which may, however, be more open, either by construction of the seat, several degrees larger, to be between 90 and 100 degrees, or, due to the adapting capacity of the back to be adjusted, allowing the user the ability to tilt the back toward the rear, more or less, in relation to the seat.

It must be noted here that the position of the seat, in particular of the seat subject in use to the essentially vertical weight of the occupant, is naturally stable since the rear rollers are located in the rear segments of the guide ramps, essentially horizontal. In this position, the actuator or the means for blocking the sear are therefore moderately called upon to prevent an unwanted horizontal movement of the seat.

Beginning with the "seated" position of the seat, when the user moves his seat, in practice the seat of the assembly, toward the front, each rear roller (54) of the seat will move in the corresponding guide ramp (43), first by following the rear segment 432 of said guide ramp, and each front carriage of the seat (52) will follow a downward slope trajectory determined by the corresponding rail (42).

In this movement of the rear rollers, of the seat in the rear segments of the guide ramps, the seat angle in relation to the horizontal will be a function of the difference of the slope between said rear segments and the rails.

In the seat according to the disclosed embodiment, the rear segments (432) are essentially horizontal, in practice, with a slope angle in relation to a horizontal plane between the angle corresponding to the value of the angle of the front slope of the rails (42) and an angle, considered from rear to front, raised above the horizontal plane by 10 degrees. In particular, an angle raised by 8 degrees provides a movement assisting in the transition to the standing position for the seat occupant, without the latter requiring any particular assistance to remain seated when he makes a transition from the "seated" position to the "resting" position.

Thus, for the extreme case in which the rear segments are parallel to the rails, the tilt of the seat is maintained constant during movement. This movement, if it is stopped when the rear rails of the seat are again in the rear segments, enables the occupant of the seat to increase the tilt of its back toward the rear, which is distanced from obstacles that may limit this tilt.

In general, when the rear segments (432) and the rails (42) form an angle open toward the front, as in the case illustrated in the figures with said rear segments essentially horizontal, the seat plate tilts progressively toward the front around the tilting axis (521) when said seat moves forward. The breadth of this tilting toward the front is a function of the angle between the rear segments and the rails and of the distance on the seat plate (51) between the rear axis (541) and the tilting axis (521).

This angular movement of the seat plate, which is accompanied by a decrease in the height of the front edge of the seat, and a decrease in the tilt of the back toward the rear in relation to the vertical, enables a user of the seat to place himself in a position that is closer to vertical and facilitates, particularly for a person with difficulties extracting himself from a seat after having remained seated for a long time, the transition to a standing position with a reduced effort.

When the forward movement of the seat continues, each rear roller (54) of the seat then moves to the corresponding intermediate rear segment (433), following a downward trajectory to the bottom point (438).

During this movement, the front carriages (52) of the seat are also moved forward on the rails (42), leading to a lowering of the tilting axis (521) of the seat.

However, the downward slope of the rear intermediate segment (433) is greater than the downward slope of the rail (42), leading to a lowering, relative to the rear roller (54) of the seat, and therefore of the rear edge of the seat (514), essentially at the junction between the seat and the back, in relation to the tilting axis (521) of the seat.

Therefore, the seat plate is, in this longitudinal position of the seat, tilted toward the rear in relation to the preceding situation, as illustrated in FIG. 2b in the "resting" position.

Beneficially, in this "resting" position, the back (60) is placed into a position to form, with the seat, a more open angle than in the "seated" position, typically an angle between 100 and 115 degrees.

The overall form of the seat resulting from movements of the seat and of the back corresponds to a tub for which the tilt toward the rear is marked in order to determine, in profile view, a recessed shape that provides the seat occupant a great deal of stability and prevents him from sliding forward in the seat, even in the case of movements of the floor (32), for example, due to turbulence encountered by an airplane in flight.

Additional lowering of the seat plate assembly associated with its tilting toward the rear prevents any raising of the front edge (515) of the seat, or at least limits the extent of this raising. The seat occupant may thus keep his feet on the floor, or on the foot rest, with the seat in the "resting" position Therefore, this configuration maintains the comfort of the occupant over a long period of time by preventing compression of the legs at the back of the knees of said occupant.

IN this position, the stability of the seat is provided by the fact that the rear rollers (54) are located at the bottom points (438) of the concave area of each guide ramp.

When movement toward the front of the seat is reinitiated, each rear roller of the seat (54) then travels the corresponding intermediate front section (434), following a rising trajectory from the bottom point (438) which continues on the essentially horizontal front segment (435) to the front extremity (437) of the guide ramp, or at least diose to said front extremity.

During this movement, the front carriages (52) of the seat are also moved forward on the rails (42), leading to a new lowering of the tilting axis (521) of the seat.

In this longitudinal position of the seat (50), the seat is essentially horizontal in the desired position in "lying" position.

This essentially horizontal position is obtained by a choice of the height HAV of the front extremity (437) of the guide ramp in relation to the height of the front carriages (52) of the seat, a choice resulting from geometric construction during design of the guide ramp (43).

As illustrated in FIG. 2c, in this "lying" position, the back (60) is tilted toward the rear in order to be essentially aligned with the seat (50), in order to form a lying surface. This tilting of the back is possible without interference with structures located behind the seat due to the movement toward the front of the seat.

As in the case of the "seated" position, in this "lying" position of the seat, the seat and seat bottom, subject in use to the essentially vertical weight of the occupant, is naturally stable since the rear rollers are located in the rear segments of the guide ramps, essentially horizontal. In this position, the actuator or the means for blocking the sear are therefore also moderately called upon to prevent an unwanted horizontal movement of the seat.

Thus, a seat is obtained that can be converted between a "seated" position and a "lying" position, with an improved intermediate "resting" position, without the requirement of installing a supplementary actuator, which would make the device more complex, add to its mass and increase its cost.

In addition, the three positions "seated", "resting" and "lying", intended for extended use, are mechanically stable, leading to a reduction in use of the actuator and/or means of blocking movements of the seat and, therefore, an improvement in the reliability of the components used.

What is claimed is:

1. A seat for a passenger in a vehicle, comprising a seat bottom and a seat back, for which a seat frame is supported by a base, by which the seat may be attached to the vehicle, said seat comprising at least one "seated" position, one "lying" position and at least one "resting" position, intermediate between the "seated" position and the "lying" position, wherein:
    a seat plate in the seat frame that can be moved in rotation around a rear axis of said seat, oriented in a transverse (Y) direction, horizontal to the seat and perpendicular to a vertical (XZ) plane of symmetry of the seat assembly, with said rear axis being positioned in an longitudinal (X) direction on a side of a rear edge of the seat;
    the seat plate can be moved in rotation around a tilting axis, parallel to the rear axis, positioned according to the longitudinal (X) direction, in front of said rear axis and between the rear edge of the seat and a front edge of the seat;
    the seat frame is moved forward during a seat conversion from the "seated" position to the "lying" position, a conversion during which:
        the tilting axis is moved on the base following a first descending trajectory in relation to the horizontal longitudinal (X) direction;
        the rear axis is moved on the base following a second continuous trajectory and comprises, successively and following a direction of movement toward the front of the seat:
            a horizontal rear segment;
            an intermediate rear segment with a downslope greater than a slope followed by the tilting axis;
            an intermediate forward segment with an upslope; and
            a horizontal front segment.

2. A seat according to claim 1 in which the movement of the seat between the "seated" position and the "lying" position is controlled by a single actuator.

3. A seat according to claim 1 in which the second continuous trajectory followed by the rear axis is determined by at least one guide ramp of the base, in which guide ramp at least one seat roller or roller circulates when the seat frame is moved longitudinally, with one roller axis or bearing of said roller positioning the rear axis.

4. A seat according to claim 1 in which the horizontal rear segment is, viewed from back to front, tilted toward the seat bottom, at the most, at an angle corresponding to an angle of the first descending trajectory, and tilted upward at an angle of 10 degrees in relation to a horizontal reference plane that is at a zero-degree angle.

5. A seat according to claim 1, comprising two rails on the base, two carriages supporting the seat plate, two guide ramps fixed to the base, which two rails, which two carriages and which two guide ramps are laid out symmetrically in relation to a vertical (XZ) plane of the overall symmetry of the seat.

6. A seat according to claim 1 in which the intermediate rear segment and the intermediate forward segment determine, at a junction of said segments, a bottom point, at a height (HMIN), according to a vertical direction (Z) in relation to a horizontal reference plane, of the second continuous trajectory, at which bottom point the rear axis is situated when the seat is in the "resting" position, with the height (HMIN) being such that, given the dimensional characteristics of the seat frame and of the base, when the seat is in the "resting" position:
    the seat plate is tilted backward in relation to the position of said seat plate in the "seated" position of the seat; and
    a resulting height in relation to a reference plane of a front edge of the seat is at the height of said front edge when the seat is in the "seated" position.

7. A seat according to claim 6 in which, when the seat is in the "seated" position, the seat is tilted backward at an angle, in relation to a horizontal reference plane, between 5 and 15 degrees.

8. A seat according to claim 6 in which, when the seat is in the "resting" position, the seat is tilted backward at an angle, in relation to a horizontal reference plane, between 18 and 30 degrees.

9. A seat according to claim 6 in which, when the seat is in the "lying" position, the seat is horizontal or tilted at an angle, in relation to a horizontal reference plane, that is less than or equal to 5 degrees absolute value.

10. A seat according to claim 6 in which each rail of the base is tilted forward at an angle between 2 and 8 degrees in relation to a horizontal reference plane.

11. A seat according to claim 1 in which the tilting axis is borne by at least one carriage, said carriage mounted on a rail of the base which guides said carriage according to the first descending trajectory when the seat frame is moved in a longitudinal direction.

12. A seat according to claim 11 in which, when the rear axis is located at a junction of the rear segment and of the intermediate rear segment, the seat is horizontal, or tilted forward.

13. A seat according to claim 1 in which structure of the seat back is jointed on the seat frame around a hinge line parallel to the transverse (Y) direction, located close to the rear edge of the seat frame, so as to determine an angle between the seat bottom and the seat back that can be adjusted, when using the seat, between a minimum value equal to 90 degrees, adapted to the "seated" position, and a maximum value equal to 180 degrees, adapted to the "lying" position.

14. A seat according to claim 13 comprising at least one base abutment working with a first stop surface of the seat back to limit forward angular movement of the seat back and working with a second stop surface of said seat back to limit backward angular movement of said seat back.

* * * * *